March 6, 1945. T. VEIT 2,370,825
APPARATUS FOR DEHYDRATING FRUIT, VEGETABLES, AND OTHER PRODUCTS
Filed Aug. 5, 1942 6 Sheets-Sheet 1

INVENTOR
Theodor Veit
BY John A. Seifert
ATTORNEY

March 6, 1945. T. VEIT 2,370,825
APPARATUS FOR DEHYDRATING FRUIT, VEGETABLES, AND OTHER PRODUCTS
Filed Aug. 5, 1942 6 Sheets-Sheet 4

INVENTOR.
Theodor Veit
BY
John O. Seifert
ATTORNEY

March 6, 1945. T. VEIT 2,370,825
APPARATUS FOR DEHYDRATING FRUIT, VEGETABLES, AND OTHER PRODUCTS
Filed Aug. 5, 1942 6 Sheets-Sheet 6

INVENTOR.
Theodor Veit.
BY
ATTORNEY

Patented Mar. 6, 1945

2,370,825

UNITED STATES PATENT OFFICE 2,370,825

APPARATUS FOR DEHYDRATING FRUIT, VEGETABLES, AND OTHER PRODUCTS

Theodor Veit, New York, N. Y.

Application August 5, 1942, Serial No. 453,695

22 Claims. (Cl. 99—246)

This invention relates to the dehydrating of products, such as fruit, vegetables and other products wherein the product preparatory to dehydrating the same is subjected to treatment to blanch and/or preserve the color, flavor and food value of the product, and it is the primary object of the invention to provide an improved method of and apparatus for treating and dehydrating fruit, vegetables and other products.

In carrying out the invention preparatory to blanching and dehydrating the product it is cleaned and in some cases the fruit or vegetables are pared and cut into slices or pieces of cubiform and preferably pierced after which the product is delivered to means for feeding and spreading the same on a deck or decks mounted in a vibratory casing and participating in the vibratory movement thereof whereby the product on the decks is progressively fed from the feed end to the discharge end of the casing, and during said feeding of the product it is subjected to the action of steam, preferably superheated steam, to blanch the product and in case of certain products at the same time subjecting it to the action of a medium to preserve the color, flavor, food value and soaking qualities of the product. The product is then in successive sequence subjected to the action of a dehydrating medium, such as air heated to a temperature above 200 degrees F. to effect a primary dehydrating of the product, and then subjected to the action of air heated to below a case hardening temperature lower than 160 degrees F., after which the dehydrated product is cooled by subjecting the same to the action of cooling air.

It is the principal object of the invention to provide an improved unitary apparatus for treating and dehydrating fruit, vegetables and other products including an open end casing carrying therein decks for supporting the product, means being provided for feeding the product onto the decks at the forward end of the casing, and the provision of means to resiliently support the casing and impart vibratory movement thereto and feed the product on the deck by an intermittent movement from the feeding end to the discharge end of the casing, and means to separate the casing into a blanching zone, primary and final dehydrating zones and a cooling zone for the dehydrated product, the blanching zone having means connected thereto for discharging a blanching medium in said zone, the dehydrating zones having means connected thereto for connecting said zones in circulation with a source of the dehydrating medium, and the cooling zone connected to means to cause the flow of a cooling medium relative to the dehydrated product.

It is another object of the invention to provide in apparatus of this character adjustable resilient supporting means for the casing, and means to impart longitudinal movement intermittently to the casing in one direction and co-operate with the resilient supporting means to impart vibratory movement to the casing to feed the product on the decks from the feeding end to the discharge end of the casing and vary the vibratory movement of the casing and thereby the feeding of the product on the decks.

It is a further object of the invention to provide in apparatus of this character improved product supporting decks, comprising a frame including side members and cross members of less width than the side members, and a sheet of preferably foraminous material secured on the frame for supporting the product to be dehydrated, the side members being provided with cut out portions for the admission and circulation of the dehydrating medium and cooling air relative to the product on the decks, and the frame further provided with means to arrange the decks with longitudinal channels and cause the dehydrating medium to flow to and fro laterally and in an upwardly and downwardly sinuous stream or streams relative to the decks.

A further object of the invention relates to the provision in dehydrating apparatus of this character forward of the blanching zone means including rotatable brushes for feeding and spreading the product to be dehydrated in a layer on the decks.

Other objects and advantages of the invention will hereinafter appear.

In the drawings accompanying and forming a part of this application.

In carrying out the embodiment of the invention illustrated in the drawings there is provided an elongated casing E of rectangular form in cross section and consisting of a bottom $a$, sides $b$ and a removable top $c$ and open at the rear or discharge end of the casing. The forward or feeding end of the side walls of the casing decline downwardly and forwardly from the top to the bottom of the casing, as shown at 28 in Figure 11.

Figures 17, 18, 19:
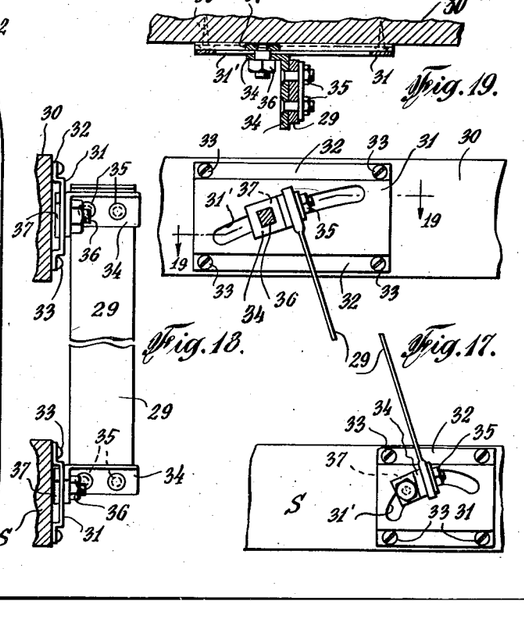
Figure 17 is a detail view in side elevation of adjustable mounting means for the resilient supporting means for the casing with an intermediate portion of the resilient member broken away.
Figure 18 is a front elevation of the resilient supporting means for the casing taken on the line 17—17 of Figure 1 looking in the direction of the arrows.
Figure 19 is a sectional view taken on the line 19—19 of Figure 17.

The casing is supported from a suitable base or foundation by resilient supporting means comprising a series of leaf spring members 29 (Figures 1, 17, 18 and 19) spaced along the opposite sides of the casing and declining in a direction from the feed end to the discharge end of the casing at an angle less than a right angle to the horizontal. The resilient leaf members 29 are adjustably secured at one end to sills S mounted on the foundation to extend parallelly of each other at opposite sides of the casing and adjustably secured at the upper ends to beams 30 extending parallelly of opposite sides of the casing and secured thereto. The means for mounting the resilient members on the sills and beams are the same and it is, therefore, deemed to be sufficient to describe one of said mounting means. As shown in Figures 17, 18 and 19 brackets 31 in the form of plates of rectangular shape have the opposite longitudinal marginal portions flanged laterally and then outwardly, as at 32, and are mounted on the outer sides of the beams and sills with the portions 32 engaging and extending longitudinally of the same and secured thereto by screws or bolts 33. The brackets for mounting the resilient members at the upper ends on the beams is of greater length than the brackets for mounting the resilient members at the lower ends on the sills S. To mount the resilient supporting members 29 on the brackets 32 each of said brackets is provided with an arcuate slot 31' extending diagonally of the brackets from adjacent the upper right hand corner to the lower left hand corner as viewed in Figure 17, the slots in the brackets fixed on the beam being in an arc of a circle having a longer radius than the slots in the brackets mounted on the sills. The resilient members are adjustably connected to the mounting brackets 31 by securing said members at one end to an angle portion of angle members 34 by bolts, as at 35. The angle members are mounted at the other angle portion on the brackets 31 by studs 36 fixed at one end in plates 37 engaging at the rear of the brackets 31 and the studs engaged in the bracket slots 31', the studs having a portion of rectangular form in cross section engaging the bracket slots 31'. The free end of the studs are screw threaded and extend through an opening in the angle members with a nut threaded thereon clamping the angles members to the bracket 31.

The casing is provided with a series of supports for the product to be dehydrated, herein termed "decks," mounted in superposed relation and extending from the discharge end of the casing to a point within the opposite declining end of the casing. The decks include a frame and product supporting surface M, which preferably comprises a foraminous material, such as woven wire mesh, although it may consist of sheet material having expanded openings therein, and in some instances sheet material will serve the purpose. The material supporting decks are mounted and supported in superposed relation in the casing with the lower deck engaging the bottom of the casing and the top of the casing engaging the uppermost deck and retaining the decks assembled in the casing. The decks extend longitudinally of the casing and while they may be arranged in one piece each deck preferably consists of a series of longitudinal sections and arranged with means to separate the casing into a series of zones, in the present instance a blanching zone, primary and final dehydrating zones and a cooling zone. The blanching zone at the forward end of the casing is of a length as indicated by A in Figure 15. The primary dehydrating zone is of a length as indicated at B and approximately ten times the length of the blanching zone. The final dehydrating zone, indicated at C, is of a length one-third greater than the length of the primary dehydrating zone, and the cooling zone D is approximately twice the length of the blanching zone.

Figures 20, 21, 22, 23, 24, 25, 26, 27:
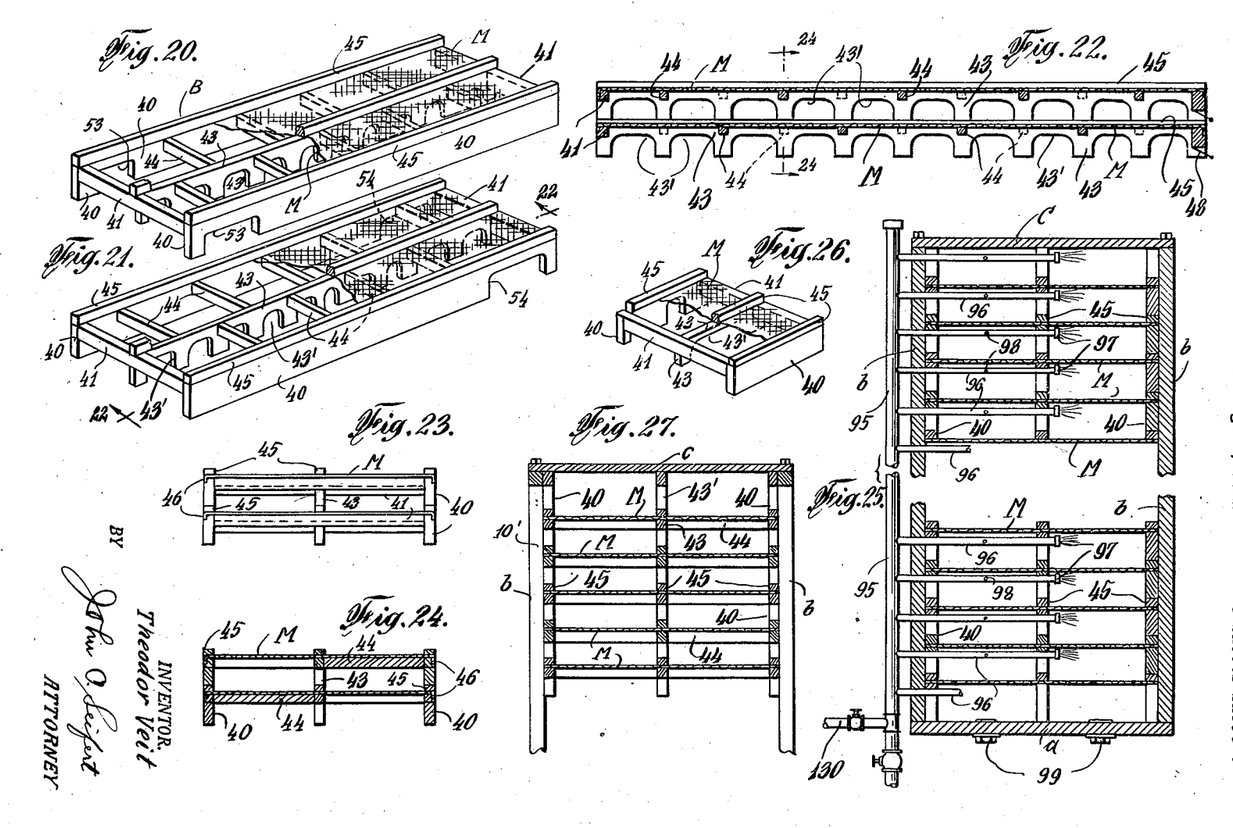
Figures 20 and 21 are perspective views of different sections of the desks.
Figure 22 is a longitudinal sectional view of a deck taken on the line 22—22 of Figure 21.
Figure 23 is an end elevation looking at the left of Figure 22 to show the superposed mounting of the decks.
Figure 24 is a sectional view taken on the line 24—24 of Figure 22.
Figure 25 is a sectional view of the blanching zone taken on the line 25—25 of Figure 5.
Figure 26 is a perspective view of one of the product supporting decks in the blanching zone.
Figure 27 is a sectional view taken on the line 27—27 of Figure 5 and showing the mounting of the decks in the dehydrating zones.
Figure 28:
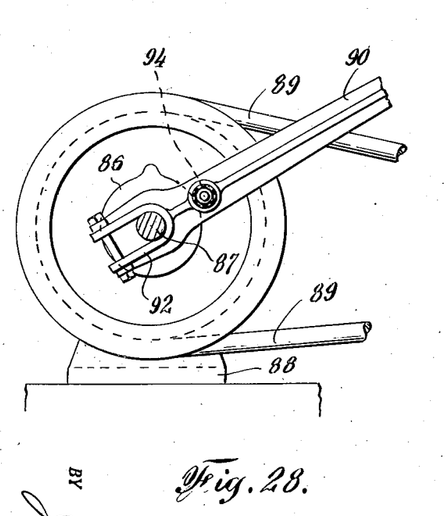
Figure 28 is a sectional view taken on the line 28—28 of Figure 29.
Figure 29:
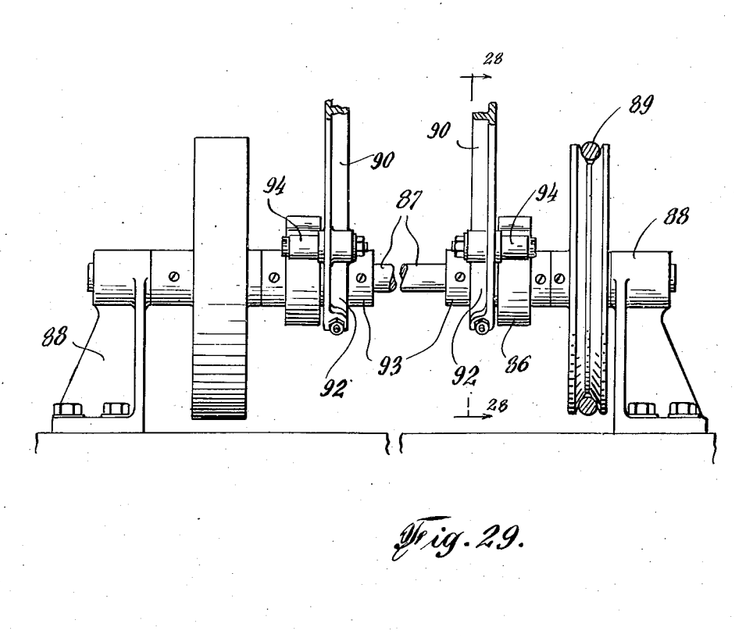
Figure 29 is a cross sectional view taken on the line 29—29 of Figure 1.

Each deck section comprises a frame of a width substantially equal to the width of the casing and including side members 40 and cross members 41 of a width less than the width of the side members and connecting the side members at the opposite ends and the top edge thereof and bridging the space between the side members. An intermediate member 43 of a width equal to the width of the side members is disposed midway of and extends parallelly of the side members and extending between and secured at the ends to the cross members 41. The intermediate member 43 separates the deck sections into a pair of channels connected in communication with each other, for a purpose hereinafter described, by cut outs 43' extended into the bottom edge of said intermediate member. Cross members 44 of a width less than the width of the cross members 41 extend transversely of the channels of the decks and are secured at the ends to the upper marginal portion of said intermediate and and the side members of the deck frames with the cross members 44 in one chanel arranged in staggered relation to the cross members in the other deck channel, as shown in Figures 20 and 21, and also arranged in staggered relation to the corresponding cross members of the next adjacent deck frames, as shown in Figure 22. The product support of the frames M is secured to the top of the intermediate and side members by rails 45 superposed to the material M and extending parallelly of and secured to the intermediate and side frame members, the side marginal portions of said supporting material preferably are flanged laterally and engage in recesses in the side frame members, as shown at 46 in Figures 23 and 24.

Figures 11, 12, 13, 14:
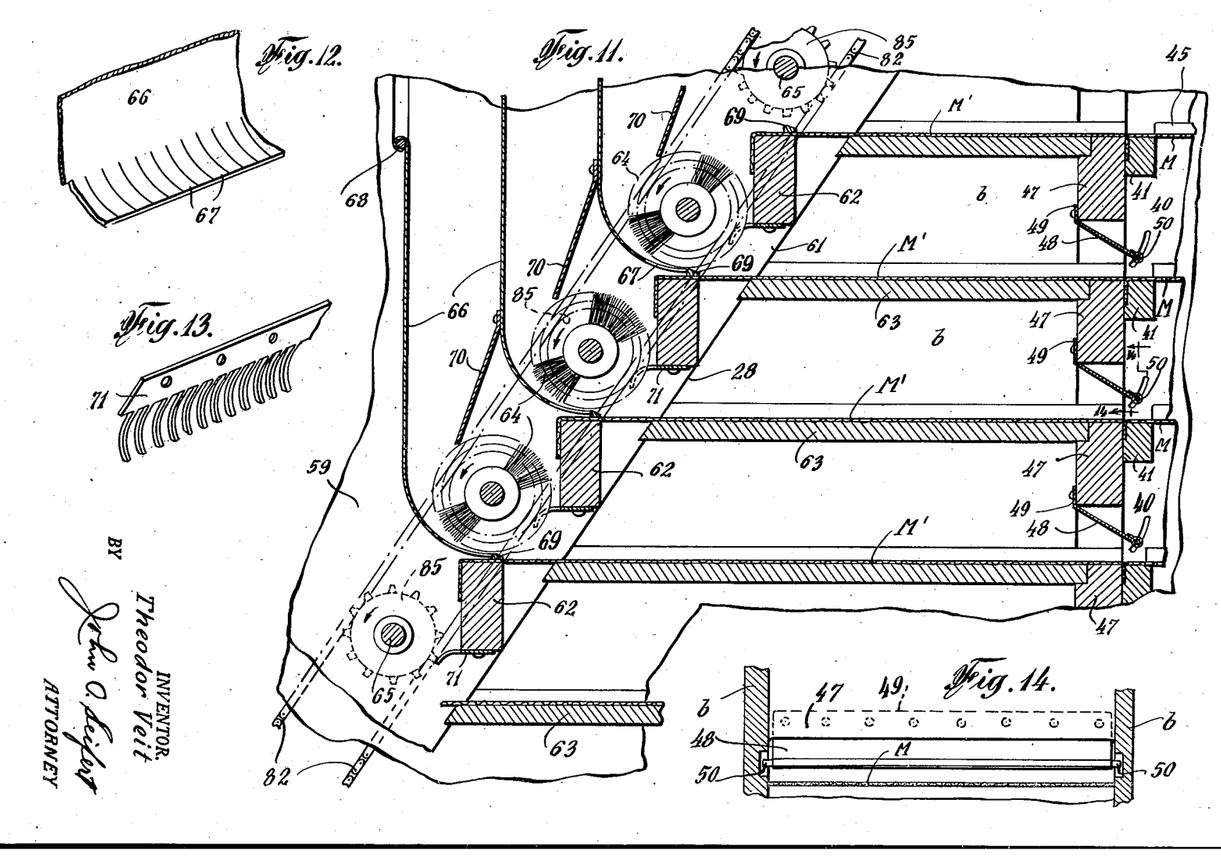
Figure 11 is a longitudinal sectional view of a portion of the feeding end of the casing and showing the feeding means in relation to the decks, the section being taken on the line 11 of Figure 5.
Figure 12 is a perspective view of a portion of a guide plate provided with spring fingers for directing the product to be dehydrated to the feeding brushes.
Figure 13 is a perspective view of a portion of a comb adapted to strip from the feeding brushes the fed product which may adhere to the brushes.
Figure 14 is a sectional view taken on the line 14—14 of Figure 11 looking in the direction of the arrows.

The deck sections in the blanching zone A are separated from the feeding end of the casing by cross members 47 extend transversely between and secured at the ends to the opposite side walls of the casing with the top surface of said cross members extending in the plane of the top surface of the cross members 41 of the deck frames. These cross members 47 are of greater width than the cross members 41 of the deck frames and of less width than the intermediate and side frame members providing a space between said cross members 41 and the supporting material M of the frames, as shown in Figure 11 for feeding material below said cross members 47 onto the decks in the blanching zone. To feed the product onto the decks in the blanching zone while maintaining said zone shut off from the feeding end of the casing wall portions of flexible material, in the nature of curtains, are suspended from the cross members 47 by attaching said wall portions at a side marginal portion to the front surface of said cross members 47 near the lower edge thereof, as at 49. These wall portions 48 are of a length substantially equal to the width of the casing and diverge rearwardly through the spaces below the cross members 47 and are weighted and supported at the lower marginal portion in predetermined position above the supporting member M of the decks and to have movement toward and away therefrom. For this purpose a rod 50 is extended through a hem or loop at the lower free marginal portion of said wall portions slidably engaging at the ends in arcuate recesses in the opposite side walls of the casing, or in the side members of the deck frames. By this arrangement a layer of the product to be dehydrated is adapted to be moved below the flexible wall portions onto the decks and in connection with said wall portions separate the blanching zone from the forward portion of the casing.

Figure 15:
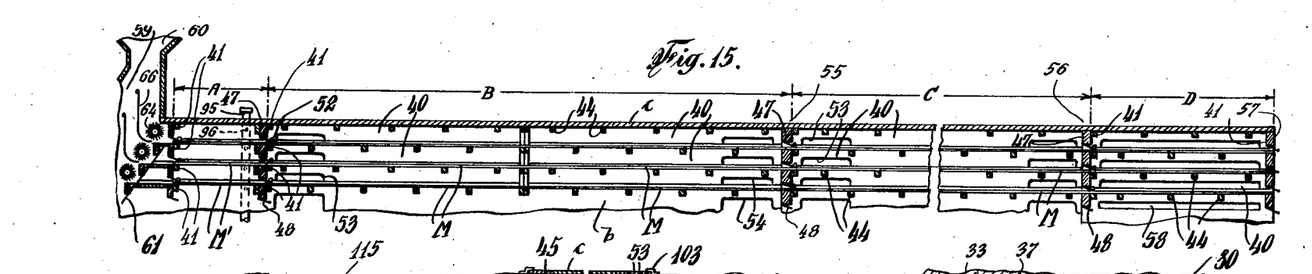
Figure 15 is a longitudinal sectional view of the upper portion of the casing taken on the line 15—15 of Figure 5.
Figure 16:
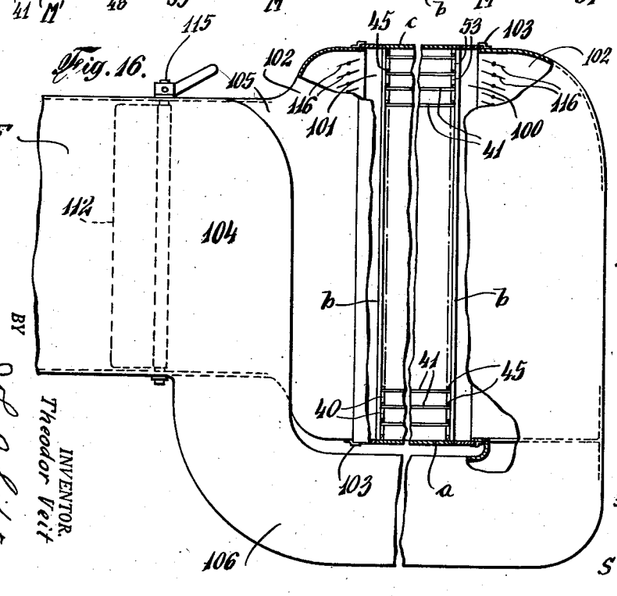
Figure 16 is a sectional view taken on the line 16—16 of Figure 1.

To separate the blanching zone from the successive primary dehydrating zone flexible wall portions 48 are attached to the rear cross member of the deck frames in the blanching zone, which cross members are of slightly greater width than the cross members 41 at the forward end of said deck frames, as shown in Figure 15. The curtains 48 are attached to and suspended from said cross members similar to connecting the curtains 48 to the cross members 47 and the lower ends are weighted and supported in a similar manner by rods 50, and said end of the curtains engage with the product to be dehydrated on the supporting surface M of the forward deck sections in the primary dehydrating zone. The primary dehydrating zone, as stated, is approximately ten times the length of the blanching zone, and two of the deck sections as shown in Figures 20 and 21 are arranged endwise and superposed in said dehydrating zone. Said primary dehydrating zone is separated from the blanching zone by a curtain or flexible wall 48, and is separated from the successive final dehydrating zone by a similar curtain 48 suspended from the cross member 41 at the rear end of the second deck section in the primary dehydrating zone, and said curtains weighted and supported at the lower end by rods similar to the rods 50 as hereinbefore set forth, and as shown at 52 in Figure 15. The forward end portion of the side members 40 of the forward deck frame sections in said primary dehydrating zone have cut out portions, as at 53, for the admission of a dehydrating medium, such as heated air, to the channels in the deck frames in said zone, and the side members of the successive deck frame sections in said zone are cut away, as at 54, and said cut outs constituting outlets for the dehydrating medium from the channels in the deck frames in said zone. Flexible wall portions or curtains 48 are also suspended from the cross member 41 at the rear end of the second section of the deck frames in said zone similar to the flexible wall portions or curtains described in connection with the cross members 47 to separate the primary dehydrating zone B from the final dehydrating zone C, as shown at 55 in Figure 15.

The final dehydrating zone, as stated, is of a length one-third greater than the primary dehydrating zone, and the decks in said zone consist of three sections as shown in Figures 20 and 21, which constitute the end sections of the decks in said zone and there is provided a further section intermediate said end sections of the decks and said deck sections are not provided with the cut outs 53 or 54, the cut outs 53 being provided in the forward end of the side members of the forward deck sections in said zone C, and the cut outs 54 being provided in the rear end of the said members of the rear sections of said decks, and the cross member 41 at the rear end of said latter deck section being provided with the flexible wall or curtains 48, as shown at 56 in Figure 15, to separate the final dehydrating zone from the cooling zone D.

The decks in the cooling zone D are substantially twice the length of the decks in the blanching zone A, as stated, and the flexible wall or curtain is also arranged to be suspended from the cross member 41 at the rear end of the deck frames in said zone D, as shown at 57 in Figure 15. The side members of the deck frames in said cooling zone D are provided with cut outs 58, as shown in Figure 1, the cut outs in one side member constituting an inlet for a cooling medium, as air, and the cut outs in the other side member of said deck frames constituting outlets for said cooling medium.

Figures 1, 2, 3, 4:
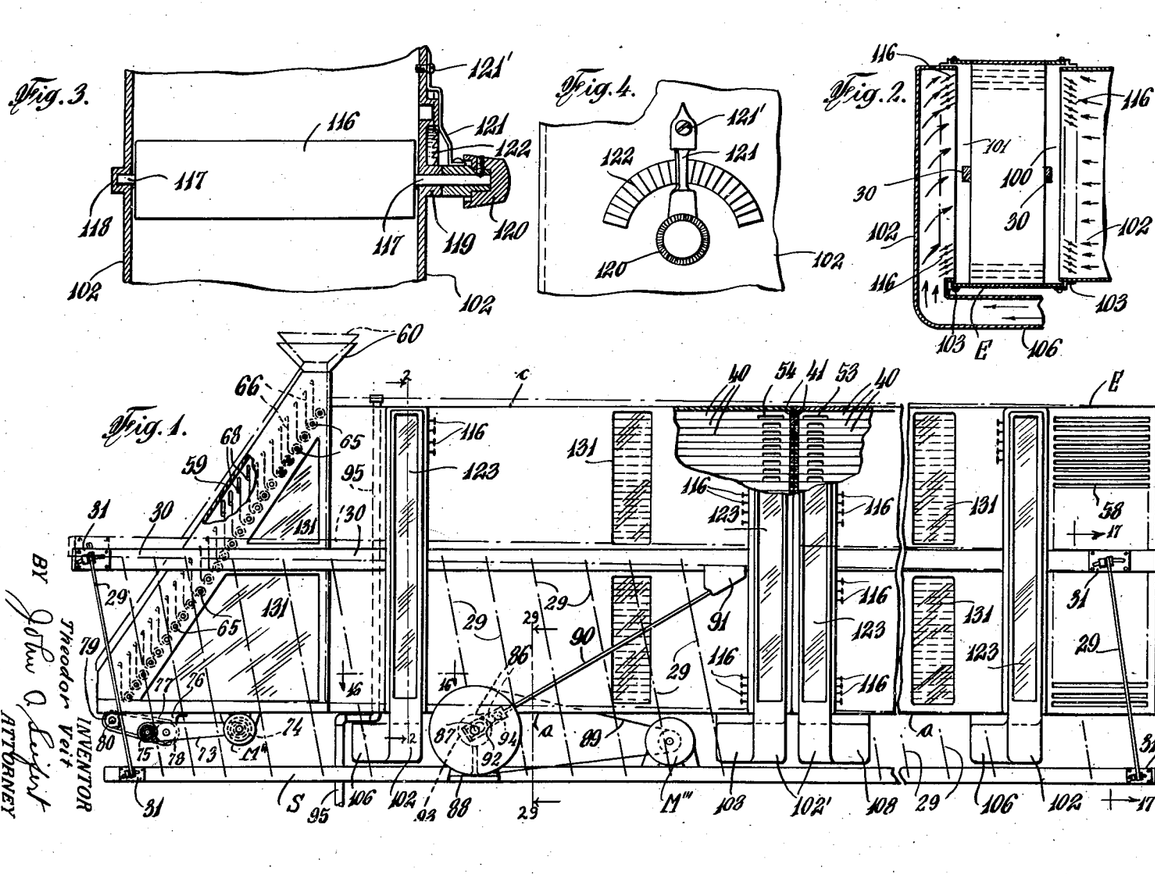
Figure 1 is a side elevation of apparatus embodying the invention.
Figure 2 is a sectional view on a reduced scale taken on the line 2—2 of Figure 1 looking in the direction of the arrows.
Figure 3 is a detail view in section to show the mounting of louvers in the connections of the dehydrating zones with means for the admission and exit of the dehydrating medium to the casing.
Figure 4 is a detail view showing means to adjust and releasably retain the louvers in adjusted positions.

To feed material or the product to be dehydrated onto the surface M of the respective decks a trough like member 59 is mounted in inverted position at the open top on the declining front end of the casing, the lower end of said trough being closed and the upper end provided with a feeding hopper 60, as shown in Figure 1. The trough is separated longitudinally into two chambers by a partition, as shown at 61 in Figure 11. Decks to support the product to be dehydrated, consisting of sheet material M', are secured at one end upon the cross members 47 and extend forward of said members to and are secured at the forward marginal portion upon cross members 62 extending transversely between and secured at the ends to the intermediate trough partition and the side walls of the trough 59. Said deck material M' is also secured to rails 63 mounted at one end on the cross members 47 and at the opposite end on the trough separating partition 61, and similar rails may be attached to the opposite side walls of the casing.

Circular brushes 64 to rotate in the trough chambers are mounted on shafts 65 journalled in the side walls and the separating partition of the trough in superposed stepped relation to the cross members 62 and space above the decks M', as shown in Figure 11. The product to be dehydrated delivered into the trough from the hopper 60 is directed to the brushes to be fed by the brushes onto the decks M' by chutes formed by walls of sheet material 66 (Figure 11) having one end curved and slitted inwardly to provide the same with spring fingers 67 (Figure 12) and having a stiffening and reinforcing bead or wire 68 at the opposite end. These sheet members are supported at the opposite edge portions in grooves mortised into the opposite surfaces of the separating partition and in the side walls of the trough, in which the opposite marginal edge portions of the sheet members are slidably engaged by endwise movement and the upper end portion of said grooves being enlarged for the reception of the reinforcing beads 68 to support the walls 66. The spring finger end of the plates 66 are free and extend to an abutment 69 mounted on the cross member 62 below and in line with the axis of the brushes. The bottom of the trough member is spaced from the reinforced end of the plates and thus provides a passage between the bottom of the trough and the reinforced ends of the plates, as shown in Figure 11, the product to be dehydrated delivered into said passage from the hopper 60 passing into the chutes formed between adjacent plates 66 and is directed to the space between the brushes and the resilient fingers 67 of the plates. To prevent such product entering into the spaces between the top of the brushes and the next upper plate 66 auxiliary guide plates 70 extend transversely of the plates 66 parallelly of the brushes and are attached at one marginal portion to the plates 66 and diverge downwardly therefrom over the top of the brushes, as shown in Figure 11. To feed a product, such as spinach, and sliced or cubed fruit and vegetables, such as apples and potatoes, in a layer of predetermined thickness onto the decks M', and in case of a sliced or cubed product in a single layer, the abutment 69 is spaced from the brushes distance equal to the thickness of said layer of the product. The spring fingers 67 of the plates 66 are normally disposed in the plane of the top of the abutment 69 to feed material of a predetermined thickness or layer. Should the product on the spring fingers of the plates 66 be of a thickness greater than such space it will move said fingers below the top of the abutment and the abutment will be engaged by and strip the lower from the upper portion of the layer and permit feeding only a portion from the top of the layer of the product presented to the brushes. To strip from the brushes any of the product that might adhere thereto a comb 71 (Figures 11 and 13) is fixed to the bottom of each cross bar 62 to extend longitudinally thereof with the teeth of the combs extending laterally from the members 62 toward the brushes. The upper wall of the trough is provided with a window or windows 72 through which to observe the operation of the feeding means.

Figures 5, 6, 7, 8, 9, 10:
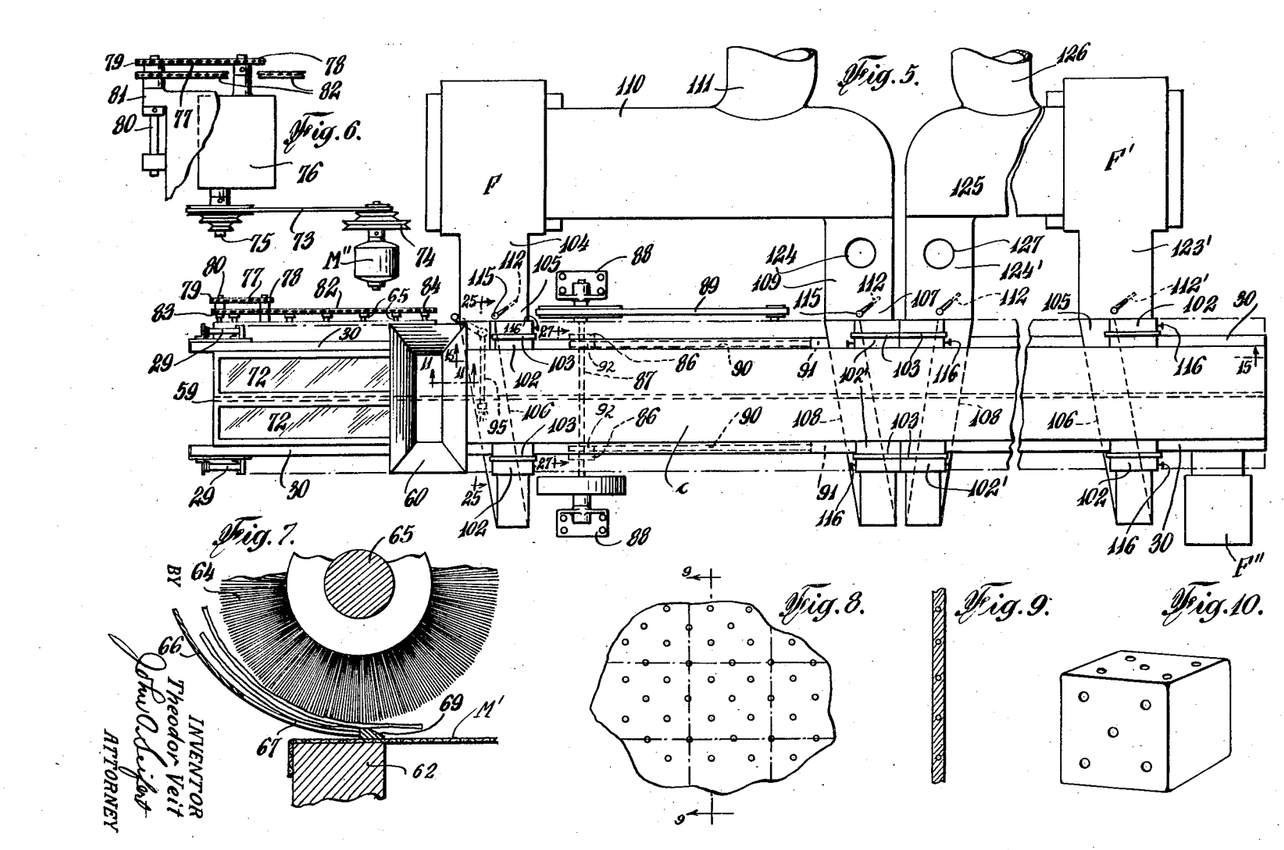
Figure 5 is a plan view of the apparatus.
Figure 6 is a detail view in plane of means to drive the means for feeding the product to the decks.
Figure 7 is a fragmentary view in elevation and on an enlarged scale to show the means to feed the product to be dehydrated in a layer onto the decks.
Figure 8 is an elevational view of a portion of the product, such as a potato, to be dehydrated to show the manner of preparing the same prior to dehydration.
Figure 9 is a sectional view taken on the line 9—9 of Figure 8.
Figure 10 is a perspective view of a portion of the product to be dehydrated reduced to cubiform.

The feeding brushes are rotated from an electric motor M" mounted on the bottom of the casing and operatively connected to a speed reducing mechanism 76 by a V belt 73 (Figure 6) passing around one of a series of stepped V faces of a pulley 74 fixed on the motor shaft and the stepped V faces of a pulley 75 fixed on the input shaft of the speed reducing mechanism whereby said shaft may be rotated at different speeds. The speed reducing mechanism is operatively connected to the brushes by a sprocket chain 77 passing around a sprocket wheel 78 on the output shaft of the speed reducing mechanism and a sprocket wheel 79 fixed on a shaft 80 journalled in a bracket 81 fixed to the casing and the rotation of said shaft 80 transmitted to the brush carrying shafts by a sprocket chain 82 passing around a sprocket wheel 83 fixed on the shaft 80 and a sprocket wheel 84 fixed to the end of the shaft of the uppermost brush carrying shaft 65 extending from a side of the trough 59. The sprocket chain 82 travels in the direction to rotate the brushes in the direction indicated by the arrows by the upper stretch of the sprocket chain 82 travelling relative to the sprocket wheels 85 fixed on each of the brush shafts, suitable means being provided to guide the chain to and maintain it in operative engagement with the sprocket wheels.

The product fed onto the decks M' are fed along said decks to and along the decks in the respective zones in the casing E by an intermittent movement thereof and imparted thereto by the vibratory movement of the casing. To impart vibratory movement to the casing and the decks therein means are provided to impart intermittent longitudinal movement to the casing in a direction toward the discharge end of the casing and subjecting the leaf spring supports 29 for the casing to intermittent tensioning forces acting to impart return movement to the casing. This means comprises as shown a pair of cams 86 fixed on the opposite end portions of a shaft 87 at opposite sides of the casing, the shaft being journalled in bearing members 88 mounted upon the supporting base and rotated from a motor M'" by a sprocket chain 89 passing around sprocket wheels fixed on the shaft of said motor and the shaft 87. The rotation of the cams 86 is transmitted to intermittent longitudinal movement of the casing by rods 90 fixed at one end to abutments on the beams 30 intermediate the ends of the casing, as at 91. The rods 90 extend diagonally downward from the beams 30 in a direction forwardly of the casing and have a bifurcated member 92 on the lower end thereof straddling and engaging a groove in collars 93 fixed on the shaft 87 juxtaposed to the cams and said bifurcated members rotatably carrying rollers 94 to follow the cams, a bar secured to and extending transversely of the bifurcation legs of said member preventing the same from moving laterally from the shaft. The spring leaves 29 supporting the casing are disposed at an angle less than a right angle to the horizontal and as the casing is moved forwardly by the rods through the rotation of the cams 86 the spring supporting leaves are moved forward and said movement slightly elevating the casing and subjecting the leaf supports to a tensioning stress acting to move the casing rearwardly and downwardly when the cam rollers ride off from the cams and said movement of the casing acting to lift the product from the decks and cause it to assume a forward position on the decks as the decks are returned to initial position. To effect a faster feeding of the product on the decks at the forward end than at the discharge end of the decks the spring leaves at the feeding end of the casing are diposed at a lesser angle to the horizontal, say 70 degrees to the horizontal, at the feeding end than at the discharge end where said spring leaves are disposed at an angle of 80 degrees to the horizontal. Of course, these angular positions of the spring leaves may be varied to vary the feeding of the product on the decks, since certain products must be subjected to the dehydrating action for a longer period of time to dehydrate the same than other products.

To blanch the product in the balancing zone steam, preferably superheated steam, is admitted into said zone by suitable means, and as shown in Figure 25 consisting of a pipe 95 leading from a source of the steam and having branch pipes 96 connected at one end thereto and extending through a side wall of the casing and cut outs in the side members 40 of the deck frames (Figure 26) into the blanching zone. The opposite ends of the branch pipes are closed by perforated caps 97 for discharging the steam into one channel of the deck frames, and said branch pipes having perforations 98 in the side wall for discharging steam into the other channel of the deck frames. Condensation water of the steam collects in the bottom of the casing and is drained therefrom through tubular outlet members 99.

The primary dehydrating zone B is connected at the forward end to a source of heated air having a high temperature, say above 200 degrees F. and is caused to flow longitudinally of the deck channels in the direction of feeding the product on the decks. For this purpose the opposite side walls of the casing at the forward end of zone B are provided with rectangular openings extending from the top to the bottom of the casing in line with the openings 53 in the side members of the forward section of the deck frames in said zone. The casing openings have a laterally extending wall disposed about the same, as shown at 100 and 101 in Figure 2. Manifolds 102 conforming in shape to said casing openings having an opening in one side and at which side they are disposed within the wall portions about the openings 100, 101, as shown at 102. The manifold connected to the casing opening 101 is connected at the side opposite said connection with the casing by a pipe 104 to the outlet of a fan F by branch pipes 105, 106, and the manifold connected to the casing opening 100 is connected at the lower end by pipe 106 extending below the casing to the pipe 104. Openings similar to the openings 100, 101 are arranged in the opposite side walls of the casing at the rear end of the zone B and having manifolds 102′ similar to the manifolds 102 connected to said openings and which manifolds are connected by branch pipes 107, 108 to a pipe connected to a pipe in communication with the inlet to the fan F and a pipe 110 connected to a source of the heated air by a pipe 111. To maintain a substantially air tight connected between the manifolds 102, 102′ and the walls about the casing openings a flexible member conforming to the shape of the manifolds is secured at one end to the walls about the casing openings and frictionally engage the manifolds, as at 103. To control the direction and vary the flow of the air from the pipe 104 into the branch pipes 105, 106 and from the branch pipes 107, 108 into the pipe 109 deflector plates 112 are pivotally mounted at one longitudinal edge portion to have adjustment on a vertical axis in the pipes 104, 109 at the juncture of the branch pipes therewith, as at 115. To variably direct the flow of the air from the manifolds 102, 102′ into the air inlet openings in the one side wall of the casing and the openings 53 in the side members of the deck frames in zone B and from the deck frames through the openings 54 in the side members of the deck frames and through the outlet openings in the side walls of the casing into the manifolds 102′ a vertical row of louvers 116 are supported to have pivotal adjustment on a horizontal axis in said manifolds, said louvers being disposed in line with the openings 53, 54 in the side members of the deck frames. To pivotally support the louvers they are provided with pintles 117 (Figures 3 and 4) extending from the opposite ends centrally of the width thereof, the one pintle pivotally engaging in bearing sockets in the one side wall of the manifold, as at 118, and the other pintles rotatably supported in and extending through bearings in the opposite side wall of the manifolds, as at 119, a knob 120 being fixed on the projecting end of said pintles at the outer side of the manifolds to manually adjust the louvers, the louvers being releasably retained in adjusted position by a spring detent 121, which may be fixed on the knobs, engaging notches in arcuate members 122 fixed to the outer side of the casing and may be secured in adjusted position by means extended through an opening in the detents and engaging the wall of the manifold, as at 121′. To observe the position of the louvers the manifolds are provided with windows, such as a glass plate mounted in the wall of the manifolds, as at 123. The outlet pipe 109 connected to the branch outlet pipes 107, 108 may have an opening 124 therein for exhausting, as to the atmosphere, a portion of the air laden with moisture absorbed from the product in the primary dehydrating zone B and discharged into the pipes 107, 108.

Air heated to below a case hardening temperature, say of less than 160 degrees F., is admitted to and caused to flow through and be discharged from the final dehydrating zone C. For this purpose openings similar to the openings 100, 101 are provided in the opposite side walls of the casing at opposite ends of said zone in line with openings 53 and 54 in the side members of the deck frame sections at the forward end and rear end of said zones. Manifolds similar to the manifolds 102, 102' are connected to said openings in the casing and the manifolds having the louvers 116 arranged therein to direct and control the flow of air from the manifolds to the product supporting decks in said zone of the casing to and through the outlet openings in the side walls of the casing and the manifolds connected thereto. The air is caused to flow in the final dehydrating zone C in a direction reverse to the direction of feeding of the product on the decks, and for convenience the inlet and outlet manifolds and the branch pipes connected thereto have been given the same reference characters as the manifolds connected to the primary dehydrating zone B and the branch pipes connected thereto. The inlet manifolds 102, as stated, are connected to the rear end of the final dehydrating zone C and the branch inlet pipes 105, 106 connected to the outlet of a fan F' by a pipe 123', and the outlet manifolds 102' are connected by the branch pipes 107, 108 by a pipe 124' to a pipe 125 connected to the inlet of the fan F' and the latter pipe connected by a pipe 126 to a source of the heated air. The pipe 124' may also have an opening 127 to exhaust, as to the atmosphere, a part of the air discharged from the final dehydrating zone C. To direct and control the flow of the air from the pipe 123 to the branch inlet pipes 105, 106 and from the branch outlet pipes 107, 108 to the pipe 124 deflectors 112' are pivotally mounted at one longitudinal edge portion in the pipes 123, 124 to have adjustment on a vertical axis.

To subject the dehydrated product to a cooling medium as it is fed through the cooling zone D openings are provided in the opposite side walls of the casing in line with openings in the side members of the deck frames in said zone, and said openings in the casing and the side members of the deck frames may be of a length slightly less than the length of said zone and the deck frames. A fan F'' is connected to the openings in one side of the casing to discharge or draw a cooling air into said zone of the casing and over the dehydrated product on the decks therein and through the openings in the opposite side wall of the casing.

In the operation of the apparatus for carrying out the method of dehydration the product to be dehydrated is filled into the hopper at the feeding end of the casing and from which hopper it drops into the chutes and the spaces between the spring fingers at one end of the chute walls and the brushes and by the rotation of the brushes is fed in a layer onto the decks M' at the feeding end of the casing. The product fed onto said decks is fed by the vibratory movement of the casing on said decks relative to the blanching zone A in which zone it is subjected to the action of the superheated steam admitted into said zone not only effecting a blanching of the product but also absorbing the surface moisture on and heating the product. Simultaneously with blanching the product certain products, such as spinach, peas and beans may be subjected to the action of a suitable medium to preserve the color, flavor and food value of the product, ammonia having been found suitable for the purpose. This medium may be admitted into the blanching zone with the steam for which purpose a pipe 130 connected to a source of the preserving medium has a valve controlled connection with the steam supply pipe, and said latter pipe may also have a valved controlled connection with the source of the steam. From the blanching zone A the product is fed progressively on the decks into the primary dehydrating zone B where it is subjected to a heated fluid, such as air or other gas, delivered into one end of the channels of the deck frames in said zone through the manifolds 102 and discharged from the opposite end of said deck channels in said zone through the manifolds 102'. The air as it flows through said zone is caused to flow in a lateral undulating path or stream from one channel into the other channel of the deck frames as it flows longitudinally of said zone by the provision of the cut outs in the intermediate member of the deck frames and thus facilitate the transfer of the moisture content of the product to and absorbed by the dehydrating air. Simultaneously with this lateral undulating flow of the air the air is caused to flow in a vertical undulating path or paths, which is effected by the cross members 44 extending transversely of the top of the channels of the deck frames. By the arrangement of the air deflecting cross members 44 as described the air entering the spaces between the decks is deflected and caused to flow in a downward direction and is impinged upon the product upon the decks and thereby deflected in an upward direction to the next deflector member 44 and the bottom of the superposed deck and this undulating flow of the air continues to the end of the zone B. The high temperature of the dehydrating fluid in zone B effects a quick absorption of the moisture content of the product and if the product were subjected to said temperature to the final dehydrating of the product it would possibly scorch the product or produce a coating on the product and thus prevent the capillary flow of the moisture in the product to the surface thereof for absorption by the heated air. To obviate this the product as it is fed relative to the final dehydrating zone C is subjected to the action of a fluid having a temperature below a case hardening temperature and thereby effect the final dehydration of the product. The flow of the air through the primary dehydrating zone is in the direction of feeding the product on the decks, whereas in the final dehydrating zone C the air flows in a direction reverse to the feeding of the product on the decks by admitting the heated air into said zone at the rear end thereof and discharging it from the forward end. The structure of the deck frames in zone C is the same as that in zone B to cause lateral and vertical undulating flow of the air. As the product is fed on the deck relative to the cooling zone D it is subjected to the action of a cooling medium, such as air, as described.

The product as it is fed from the feed end to the discharge end of the decks is progressively reduced in bulk due to the dissipation of the water constituent of the product, and to maintain a sufficient quantity of the product on the decks to practically cover the same and effect a more efficient operation of the apparatus, the product is fed at a progressively reduced rate on the decks from the feeding end to the discharge end of decks and in effect producing a crowding of the product to the discharge end. This is accomplished by producing greater vibratory movement of the casing and thereby of the decks at the feed end than at the discharge end by the angular adjustment of the casing supporting leaf springs.

To observe the products on the decks in the different zones as the product is fed through the casing the side walls of the casing may be provided with windows 131 disposed relative to the feeding end and the dehydrating zones and such windows are disposed relative to cut outs in the opposite side members of the deck frames.

Various modifications may be made in the construction of the parts without departing from the scope of the invention, and portions of the apparatus may be used without others and come within the scope of the invention.

Having described my invention, I claim:

1. In dehydrating apparatus, an elongated casing, means forming superposed decks in and extending longitudinally of the casing to support the product to be dehydrated, means for feeding the product onto the decks at one end of the casing, resilient supporting means for the casing, and means operative to intermittently move the casing longitudinally in one direction and in conjunction with the resilient supporting means imparting longitudinal vibratory movement to the casing and effect feeding of the product on the decks from the feeding end to the discharge end of the casing, and means for connecting the casing to a source of and circulating a heated medium through the casing to dehydrate the production the decks.

2. In dehydrating apparatus, an elongated casing, decks mounted in superposed spaced relation in the casing and extending longitudinally thereof to support the product to be dehydrated, means at one end of the casing for feeding the product in a layer onto the decks, pairs of plates of resilient material secured at one end to opposite sides of and spaced longitudinally of the casing and extending downwardly therefrom and mounted at the opposite end on a supporting base to yieldingly support and urge the casing longitudinally to predetermined position in one direction, and means to intermittently impart movement to the casing against the resiliency of said supporting plates, and said supporting plates moving the casing in the opposite direction and imparting vibratory movement to the casing and thereby feed the product on the decks from the feed end to and discharging the same from the decks at the opposite end of the casing.

3. Dehydrating apparatus as claimed in claim 1, wherein the means to feed the product onto the decks comprises a series of rotatable brushes spaced upwardly from and extending transversely of the entrance end of the decks, vertical plates extending transversely of the casing forward of the brushes having the lower end portion arranged with spring fingers and curved toward the brushes to extend between the decks and brushes below the axis of the latter and adapted to direct the product to the brushes, and means to strip from the brushes any of the product adhering thereto and delivering the same onto the decks.

4. Dehydrating apparatus as claimed in claim 1, wherein the front end of the casing declines forwardly from the top to the bottom of the casing and the decks terminate equal distances from said end wall, and the means to feed the product onto the decks comprises rotatable brushes spaced above and extending transversely of the entrance end of the decks, plates extending transversely and vertically of the casing and spaced forwardly of the brushes with the upper end terminating equal distances from the declining end wall of the casing and arranged with spring fingers at the lower end curved toward and terminating below the axis of the brushes above the decks, a supply hopper opening to the space above said vertical plates and declining end wall of the casing to deliver the product between said plates and brushes, and combs at the rear of and extending parallelly of the brushes to strip from the brushes any product adhering thereto.

5. Dehydrating apparatus as claimed in claim 1, wherein the entrance end of the decks are disposed in stepped relation and the means to feed the product to the decks comprises rotatable brushes spaced above and extending transversely of the ends of the decks abutments extending parallelly of and below the brushes, plates extending vertically and transversely of the casing parallelly of and spaced forward of the brushes and the free lower ends arranged with spring fingers curved toward and terminating below the brushes in parallel relation to the abutments, and the spring fingers of said plates adapted to be sprung away from the brushes by the feeding of superposed portions of the product and cause the lower portion of the product to engage the abutment and strip and feed a superposed portion of the product in a layer onto the decks.

6. In dehydrating apparatus as claimed in claim 2, means to adjustably connect the resilient casing supporting plates to their support and the casing to vary the vibratory movement imparted to the casing and the feeding of the product on the decks from the feed end to the discharge end of the decks.

7. Dehydrating apparatus as claimed in claim 1, wherein the product supporting decks comprise a frame substantially equal to the width of the casing and including side members connected at the ends adjacent the top by cross members bridging the space between the side members, a supporting member for the product secured to the top of and extending between said frame members, and rails superposed to said supporting member secured to the top of and extending parallelly of the side frame members, and said frame members having openings adapted to register with openings in the side walls of the casing for the admission and the circulation and discharge of said heating medium to dehydrate the product on the decks.

8. Dehydrating apparatus as claimed in claim 1, wherein each of the product supporting decks comprises a frame of a width substantially equal to the width of the casing and including side members connected at the ends adjacent the upper edge by cross bars of less width than the side members, and the side members having cut out portions adjacent the end adapted to register with openings in the side walls of the casing, said cut outs at one end of the frames constituting inlets for heated air to flow relative to the product on the decks and the cut outs at the opposite end constituting outlets for said air, a member extending parallelly of and midway between the side members separating the deck frame into channels, and said member having cut outs extended into the bottom edge and spaced longitudinally thereof connecting the channels in communication and causing a lateral undulating flow of the air from one channel to the other channel, a foraminous material secured to the top of said frame members, rails superposed to and extending parallelly of the side and intermediate members, and cross members of less width than and secured to the upper portion of said intermediate and side members to extend transversely of the deck channels and adapted to deflect and cause the air to flow in an upward and downward undulating path in said channels.

9. In dehydrating apparatus, a casing, supporting decks for the product to be dehydrated mounted in superposed spaced relation in the casing, means in the forward end of the casing for feeding the product onto the decks, means to resiliently support and impart longitudinal vibratory movement to the casing to feed the product on the decks from the feeding end to the opposite end of the decks, members of flexible material suspended from and extending transversely of the decks separating the casing into a blanching zone at the feeding end, successive primary and final dehydrating zones and a cooling zone, means to connect and supply superheated steam to the blanching zone above each deck therein, manifolds extending from the top to the bottom of opposite sides of the casing at the opposite ends of the dehydrating zones and opening through the side walls to the casing to opposite ends of the decks, and said manifolds adapted for connecting said zones independently in circulation with a heated air supply, and the opposite side walls of the casing at the cooling zone having openings therein, and means to connect said latter openings in one side wall of the casing to means to induce the flow of a cooling medium transversely of the decks.

10. Dehydrating apparatus as claimed in claim 9, wherein the means to supply superheated steam to the blanching zone comprises a pipe extending vertically of a side of the casing adapted to be connected to a source of superheated steam, and branch pipes connected to said pipe extended through the side wall of the casing to extend transversely thereof relative to the decks and having discharge orifices opening to said zone.

11. Dehydrating apparatus as claimed in claim 9, wherein the manifolds connected to the forward and rear ends of the primary dehydrating zone are connected to a source of heated air to cause the flow of said air through said zone in the direction of feeding the product, and the manifolds connected to the forward and rear ends of the final dehydrating zone are connected to the source of heated air to cause said air to flow through said zone in a direction reverse to the feeding of the product on the decks.

12. Dehydrating apparatus as claimed in claim 9, wherein the means to connect the manifolds opening to the casing at each end of the dehydrating zones, comprises a conduit in communication with each manifold, a main conduit connected to the heated air supply connected to the conduits in communication with the manifolds opening to each end of said zones, and adjustable means mounted in the main conduits at the connection thereof with and between the conduits in communication at one end of each zone to direct and control the flow of the air from said main conduits in communication with said manifolds and direct and control the flow of the air from the conduits connected to the manifolds in communication with the opposite end of each zone into the main conduits connected thereto.

13. Dehydrating apparatus as claimed in claim 9, wherein the means to connect the manifolds opening to the casing at each end of the dehydrating zones with the heated air supply, comprises a conduit in communication with each manifold, a main conduit connected to the heated air supply connected to the conduits in communication with the manifolds to each end of said zones, a deflector plate pivotally supported to have movement on one of its longitudinal edge portions in the main conduits at the connection thereof with and between the conduits in communication with the manifolds at one end of each zone to direct and control the flow of the air from said main conduits into the conduits connected thereto and direct and control the flow of the air from the conduits in communication with the manifolds at the opposite end of each of said zones into the main conduits connected thereto, and means mounted on the pivot of said deflector plates to manually adjust the same.

14. Dehydrating apparatus as claimed in claim 2, wherein the means to connect the supporting plates of resilient material to the casing and their supports, comprise a pair of beams one fixed to each side of and extending longitudinally of the casing and the supports include parallelly extending sills, bracket plates having the opposite marginal portions offset laterally and at which offset portions the brackets are fixed to the beams and sills with the intermediate portion of the brackets spaced therefrom and having arcuate slots therein, angle members connected by an angle portion at opposite ends of the resilient supporting plates, and means engaging the slot in the brackets to secure the angle members at the other angle portion to the brackets on the beams and sills.

15. Dehydrating apparatus as claimed in claim 2, wherein the means to intermittently move the casing longitudinally against the resilient force of the supporting plates, comprises rods fixed at one end to the beams to extend downwardly therefrom diagonally to the beams, a motor driven shaft, journalled in bearings and extending transversely below the casing and having cams fixed thereon at the opposite sides of the casing, a bifurcated member connected to the opposite end of each rod straddling the shaft at the side of the cam, and a roller carried by said bifurcated member to follow the cams.

16. In apparatus for dehydrating fruit, vegetables and other products, an elongated casing, means to resiliently support and impart longitudinal vibratory movement to said casing, decks for supporting the product to be dehydrated mounted in superposed spaced relation in the casing and arranged with means to separate the casing transversely into a series of successive zones, means to supply the product to one end of said decks and said product fed on the decks relative to the successive zones to the opposite end thereof by the vibratory movement of the decks with the casing, means connected to a source of and discharging steam into the first zone to effect blanching of the product, means connected to the opposite ends of the successive zones to connect said zones in circulation with a source of fluid heated to a high temperature and cause the same to flow in the direction of feeding of the product on the decks and effect a primary dehydrating of the product, and means connecting the opposite ends of the successive zone in circulation with a source of fluid heated below a case hardening temperature and cause said fluid to flow in a direction reverse to the direction of feeding the product and effect a final dehydration of the product.

17. Apparatus as claimed in claim 16, wherein the decks in the dehydrating zones are arranged with means to cause the fluid to flow in lateral and vertical undulating paths relative to the decks.

18. An apparatus for dehydrating fruit, vegetables and other products, an elongated casing having superposed decks therein for supporting material to be dehydrated, means continuously supplying the material to be dehydrated to one end of the decks, means to vibrate the casing with the decks and thereby progressively move the material on the decks from the receiving end to the opposite end of the decks, means connected to a source of a superheated fluid medium and the casing adjacent the end at which the material is supplied to the decks for discharging said medium into said portion of the casing and subject the material on the decks to the action of said medium to blanch the material, means connecting a successive section of the casing to a source of and circulating through said section a high temperature fluid medium and effect primary dehydrating of the material, means connecting a successive section of the casing to a source of circulating through said section a fluid medium heated below a case hardening temperature and effect final dehydrating of the material, and means connecting a successive section to a source of and causing a cooling medium to flow transversely of the dehydrated material on the decks.

19. In apparatus for dehydrating fruit, vegetables and other materials as claimed in claim 18, means connected to a source of and for discharging into the casing with the superheated fluid medium and subject the material to the action of a medium to preserve the color and flavor of the material.

20. Apparatus for dehydrating fruit, vegetables and other products as claimed in claim 18, wherein the medium discharged into the casing to blanch the material consists of superheated steam, and the fluid medium to preserve the color and flavor of the material consists of ammonia.

21. In apparatus for dehydrating fruit, vegetables and other material, an elongated casing, decks mounted in superposed spaced relation in the casing for supporting material to be dehydrated, means at one end of the casing to supply a layer of material to the decks, means to impart vibratory movement to the casing with the decks to effect intermittent turning and progressive movement of the material on the decks from the receiving end to the opposite end of the casing, means predeterminedly spaced longitudinally of the casing extending transversely thereof above the decks separating the casing into a series of zones, means connected to a source of mediums for blanching and preserving the color and flavor of the material connected to and discharge said mediums into the first zone relative to the material on the decks therein, means connected in communication with the opposite ends of the successive zone adapted to connect said zone in circulation with a source of a fluid medium heated to a high temperature and causing the same to flow through said zone in the direction of feeding movement of the material on the decks and effect primary dehydrating of the material, and means connected in communication with the opposite ends of the successive zone adapted to connect the said zone in circulation with a source of fluid medium heated below a case hardening temperature and cause said fluid medium to flow in a direction reverse to the direction of the feeding movement of the material and effecting final dehydrating of the material.

22. Apparatus for dehydrating fruit, vegetables and other material as claimed in claim 18, wherein the decks are arranged with means between the sides and disposed longitudinally of the decks to cause the fluid mediums to flow in a sinuous path laterally of the decks and in an upwardly and downwardly undulating path longitudinally of the decks.

THEODOR VEIT.